(12) United States Patent
Xue et al.

(10) Patent No.: US 12,096,476 B2
(45) Date of Patent: Sep. 17, 2024

(54) SENSE AND TRANSMISSION OF MULTIPLE TRANSPORT BLOCKS FOR NEW RADIO SIDELINK

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 17/445,125

(22) Filed: Aug. 16, 2021

(65) Prior Publication Data

US 2022/0070936 A1 Mar. 3, 2022

Related U.S. Application Data

(60) Provisional application No. 62/706,556, filed on Aug. 25, 2020.

(51) Int. Cl.
*H04W 74/0816* (2024.01)
*H04W 72/02* (2009.01)
(Continued)

(52) U.S. Cl.
CPC ....... *H04W 74/0816* (2013.01); *H04W 72/02* (2013.01); *H04W 72/0446* (2013.01); *H04W 80/02* (2013.01); *H04W 92/18* (2013.01)

(58) Field of Classification Search
CPC ............. H04W 74/0816; H04W 72/02; H04W 72/0446; H04W 80/02; H04W 92/18; H04W 74/0808
See application file for complete search history.

(56) References Cited

U.S. PATENT DOCUMENTS

2018/0302915 A1* 10/2018 Einhaus ................. H04W 16/14
2019/0174547 A1* 6/2019 Khoryaev ............... H04W 4/46
(Continued)

FOREIGN PATENT DOCUMENTS

WO WO-2017026463 A1 * 2/2017 ............. H04W 4/04

OTHER PUBLICATIONS

Harada et al, "User Device and Signal Transmission Method", Feb. 16, 2017, WO, English language translation of WO 2017026463 (Year: 2017).*

(Continued)

*Primary Examiner* — Michael K Phillips
(74) *Attorney, Agent, or Firm* — Harrity & Harrity LLPQualcomm Incorporated

(57) ABSTRACT

Various aspects of the present disclosure generally relate to wireless communication. In some aspects, a user equipment (UE) may determine candidate resources on one or more physical sidelink shared channels (PSSCHs) that are clear for transmitting at least two transport blocks, based at least in part on sensing a plurality of subchannels on the one or more PSSCHs with respect to listen-before-talk completion instants for the at least two transport blocks. The UE may select, from among the candidate resources, transmit resources on the one or more PSSCHs for transmitting the at least two transport blocks such that the at least two transport blocks are transmitted in one of: different subchannels of a same slot, or contiguous slots of a same subchannel. The UE may transmit the at least two transport blocks in the transmit resources. Numerous other aspects are provided.

30 Claims, 15 Drawing Sheets

(51) Int. Cl.
*H04W 72/0446* (2023.01)
*H04W 80/02* (2009.01)
*H04W 92/18* (2009.01)

(56) References Cited

U.S. PATENT DOCUMENTS

| | | | |
|---|---|---|---|
| 2019/0273592 A1* | 9/2019 | Baghel | H04L 5/0048 |
| 2019/0306923 A1* | 10/2019 | Xiong | H04J 13/0062 |
| 2020/0029318 A1 | 1/2020 | Guo | |
| 2020/0037343 A1* | 1/2020 | He | H04W 28/0268 |
| 2020/0146062 A1 | 5/2020 | Xu et al. | |
| 2020/0374978 A1* | 11/2020 | Panteleev | H04W 72/0446 |
| 2021/0007081 A1* | 1/2021 | Shin | H04L 1/1896 |
| 2021/0314796 A1* | 10/2021 | Hoang | H04W 52/36 |
| 2022/0173854 A1* | 6/2022 | Chae | H04L 1/1893 |
| 2022/0287008 A1* | 9/2022 | Kang | H04W 76/30 |
| 2022/0303952 A1* | 9/2022 | Hoang | H04L 5/0005 |
| 2022/0353045 A1* | 11/2022 | Zhao | H04W 76/14 |
| 2022/0369291 A1* | 11/2022 | Shibaike | H04L 1/1893 |
| 2023/0126112 A1* | 4/2023 | Lin | H04W 72/02 370/329 |
| 2023/0231654 A1* | 7/2023 | Ganesan | H04L 1/1887 370/329 |

OTHER PUBLICATIONS

Intel Corporation: "Sidelink Physical Layer Procedures for NR V2X Communication", 3GPP Draft, 3GPP TSG RAN WG1 Meeting #98bis, R1-1910653 Intel—EV2X_SL_L1_Procedure, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 8, 2019 (Oct. 8, 2019), XP051789445, 10 pages. Retrieved from the Internet: URL: http://www.3gpp.org/ftp/tsg_ran/WG1_RL1/TSGR1_98b/Docs/R1-1910653.zip [retrieved on Oct. 8, 2019] section 2.3.1, p. 5, lines 3-6.
International Search Report and Written Opinion—PCT/US2021/071207—ISA/EPO—Dec. 1, 2021.

* cited by examiner

SENSE AND TRANSMISSION OF MULTIPLE TRANSPORT BLOCKS FOR NEW RADIO SIDELINK

CROSS-REFERENCE TO RELATED APPLICATION

This Patent Application claims priority to U.S. Provisional Patent Application No. 62/706,556, filed on Aug. 25, 2020, entitled "SENSE AND TRANSMISSION OF MULTIPLE TRANSPORT BLOCKS FOR NEW RADIO SIDELINK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sensing and transmitting multiple transport blocks for New Radio sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes determining candidate resources on one or more physical sidelink shared channels (PSSCHs) that are clear for transmitting at least two transport blocks, based at least in part on sensing a plurality of subchannels on the one or more PSSCHs with respect to listen-before-talk (LBT) completion instants for the at least two transport blocks. The method includes selecting, from among the candidate resources, transmit resources on the one or more PSSCHs for transmitting the at least two transport blocks such that the at least two transport blocks are transmitted in one of: different subchannels of a same slot, or contiguous slots of a same subchannel. The method also includes transmitting the at least two transport blocks in the transmit resources.

In some aspects, a UE for wireless communication includes a memory and one or more processors coupled to the memory, the one or more processors configured to determine candidate resources on one or more PSSCHs that are clear for transmitting at least two transport blocks, based at least in part on sensing a plurality of subchannels on the one or more PSSCHs with respect to LBT completion instants for the at least two transport blocks. The one or more processors are configured to select, from among the candidate resources, transmit resources on the one or more PSSCHs for transmitting the at least two transport blocks such that the at least two transport blocks are transmitted in one of: different subchannels of a same slot, or contiguous slots of a same subchannel, and transmit the at least two transport blocks in the transmit resources.

In some aspects, a non-transitory computer-readable medium storing a set of instructions for wireless communication includes one or more instructions that, when executed by one or more processors of a UE, cause the UE to determine candidate resources on one or more PSSCHs that are clear for transmitting at least two transport blocks, based at least in part on sensing a plurality of subchannels on the one or more PSSCHs with respect to LBT completion instants for the at least two transport blocks, select, from among the candidate resources, transmit resources on the one or more PSSCHs for transmitting the at least two transport blocks such that the at least two transport blocks are transmitted in one of: different subchannels of a same slot, or contiguous slots of a same subchannel, and transmit the at least two transport blocks in the transmit resources.

In some aspects, an apparatus for wireless communication includes means for determining candidate resources on one or more PSSCHs that are clear for transmitting at least two transport blocks, based at least in part on sensing a plurality of subchannels on the one or more PSSCHs with respect to LBT completion instants for the at least two transport blocks, means for selecting, from among the candidate resources, transmit resources on the one or more PSSCHs for transmitting the at least two transport blocks such that the at least two transport blocks are transmitted in one of: different subchannels of a same slot, or contiguous slots of a same subchannel, and means for transmitting the at least two transport blocks in the transmit resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
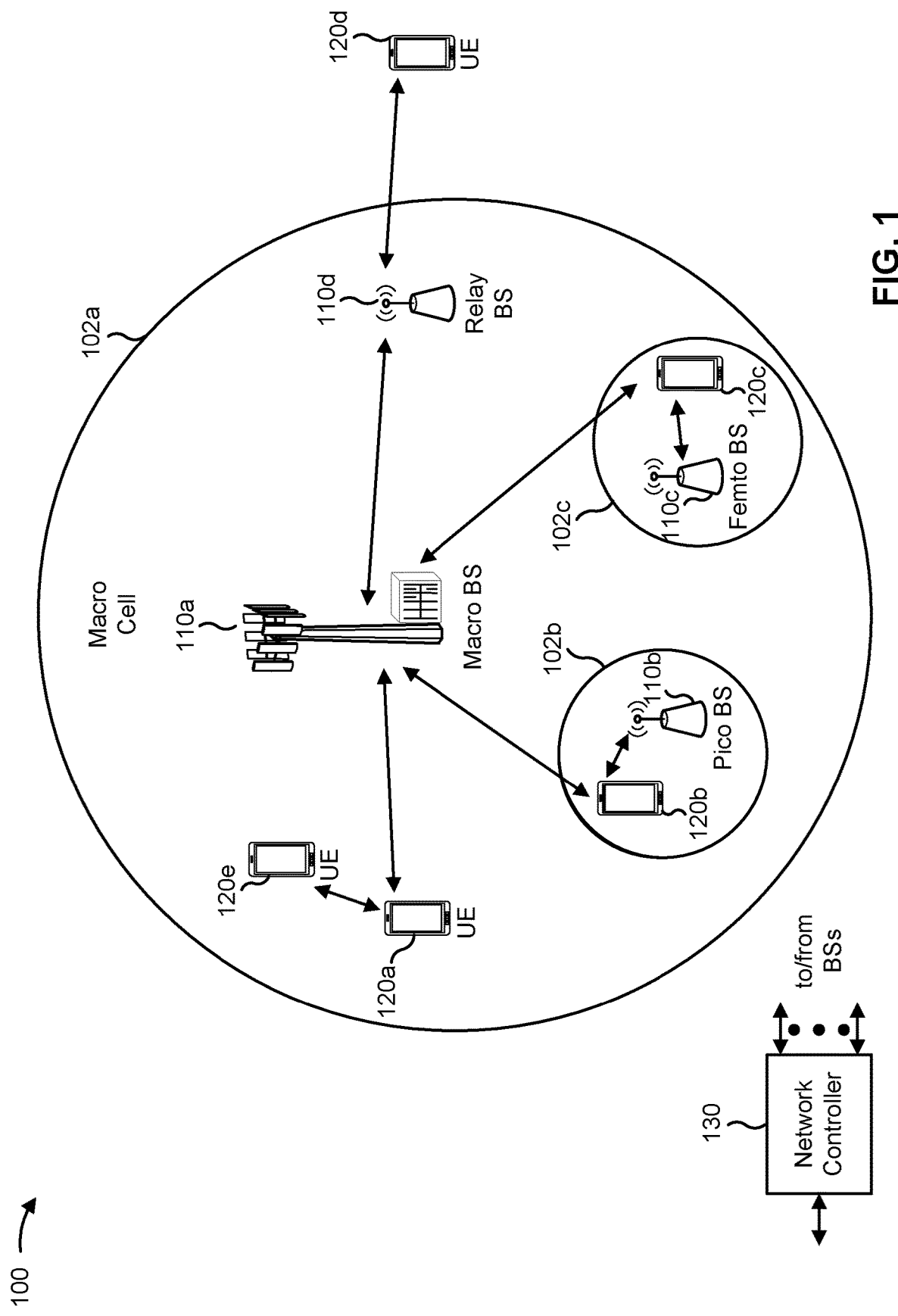
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-pedestrian (V2P) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
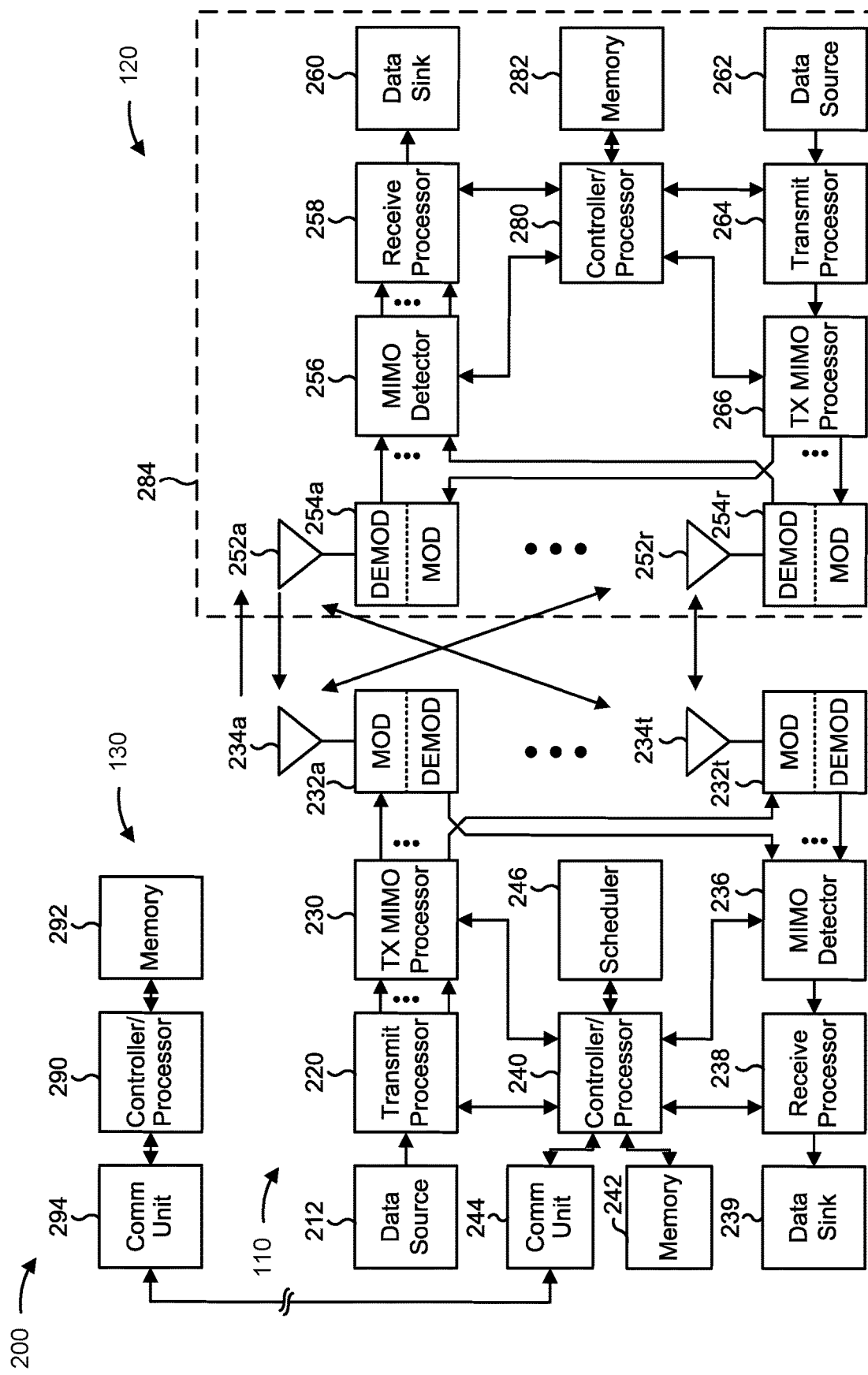
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-15).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-15).

Controller/processor 240 of base station 110, controller/processor 280 of UE 120, and/or any other component(s) of FIG. 2 may perform one or more techniques associated with sensing and transmitting multiple transport blocks for NR sidelink, as described in more detail elsewhere herein. For example, controller/processor 240 of base station 110, controller/processor 280 of UE 120, and/or any other component(s) of FIG. 2 may perform or direct operations of, for example, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 1400 of FIG. 14, and/or other processes as described herein. In some aspects, executing instructions may include running the instructions, converting the instructions, compiling the instructions, and/or interpreting the instructions, among other examples.

In some aspects, UE 120 may include means for determining candidate resources on one or more physical sidelink shared channels (PSSCHs) that are clear for transmitting at least two transport blocks, based at least in part on sensing a plurality of subchannels on the one or more PSSCHs with respect to listen-before-talk (LBT) completion instants for the at least two transport blocks, means for selecting, from among the candidate resources, transmit resources on the one or more PSSCHs for transmitting the at least two transport blocks such that the at least two transport blocks are transmitted in one of: different subchannels of a same slot, or contiguous slots of a same subchannel, and/or means for transmitting the at least two transport blocks in the transmit resources. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
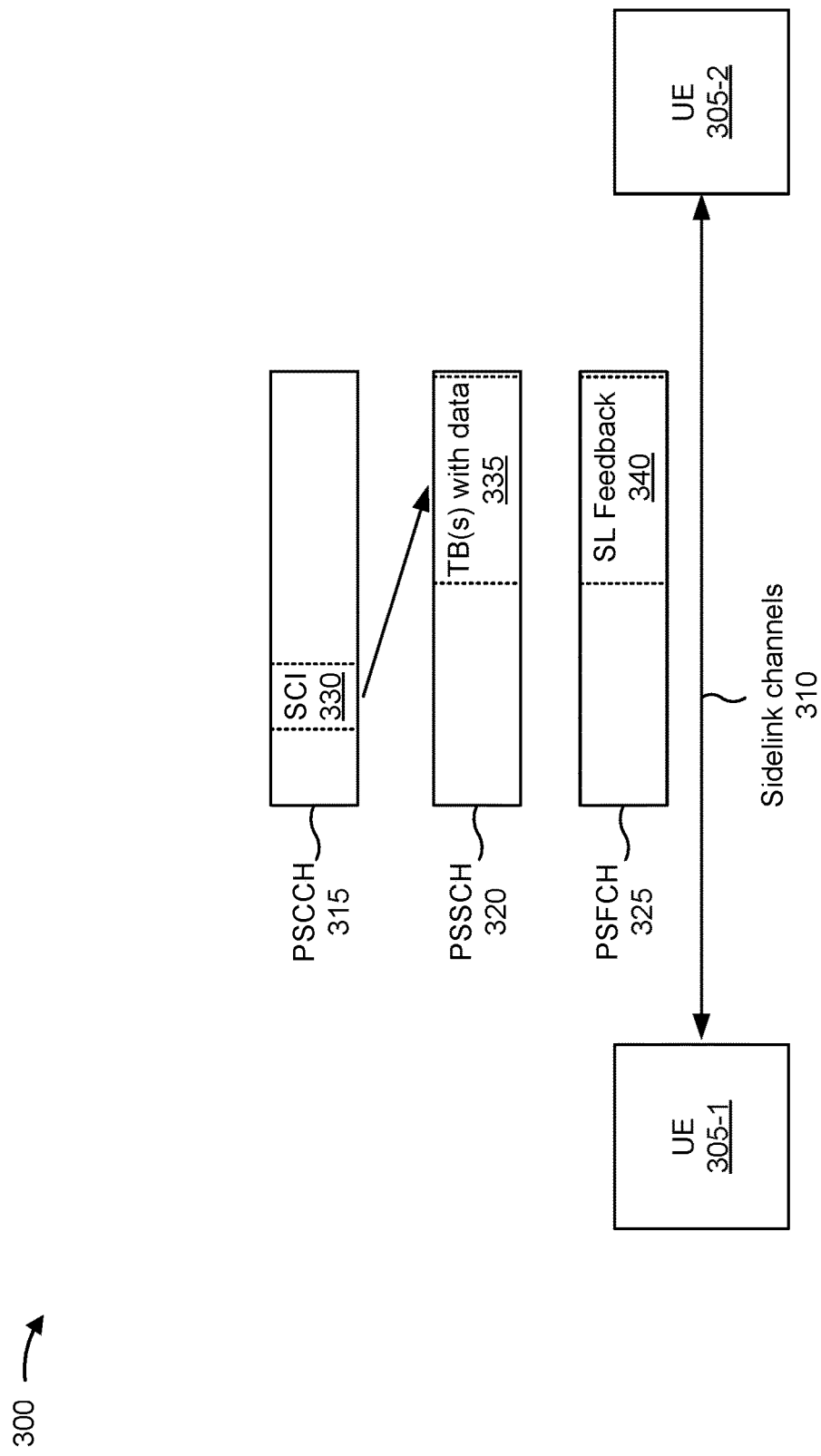
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a PSSCH 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, and/or channel parameters. Additionally, or alternatively, the UE 305 may perform resource selection and/or scheduling by determining a channel busy rate/ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
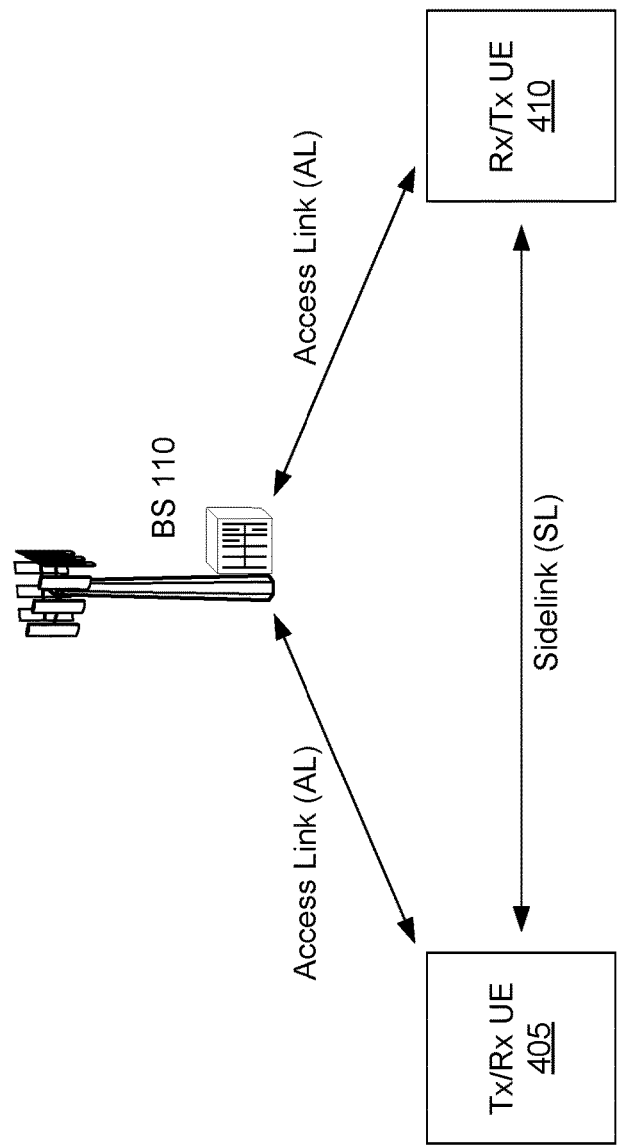
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
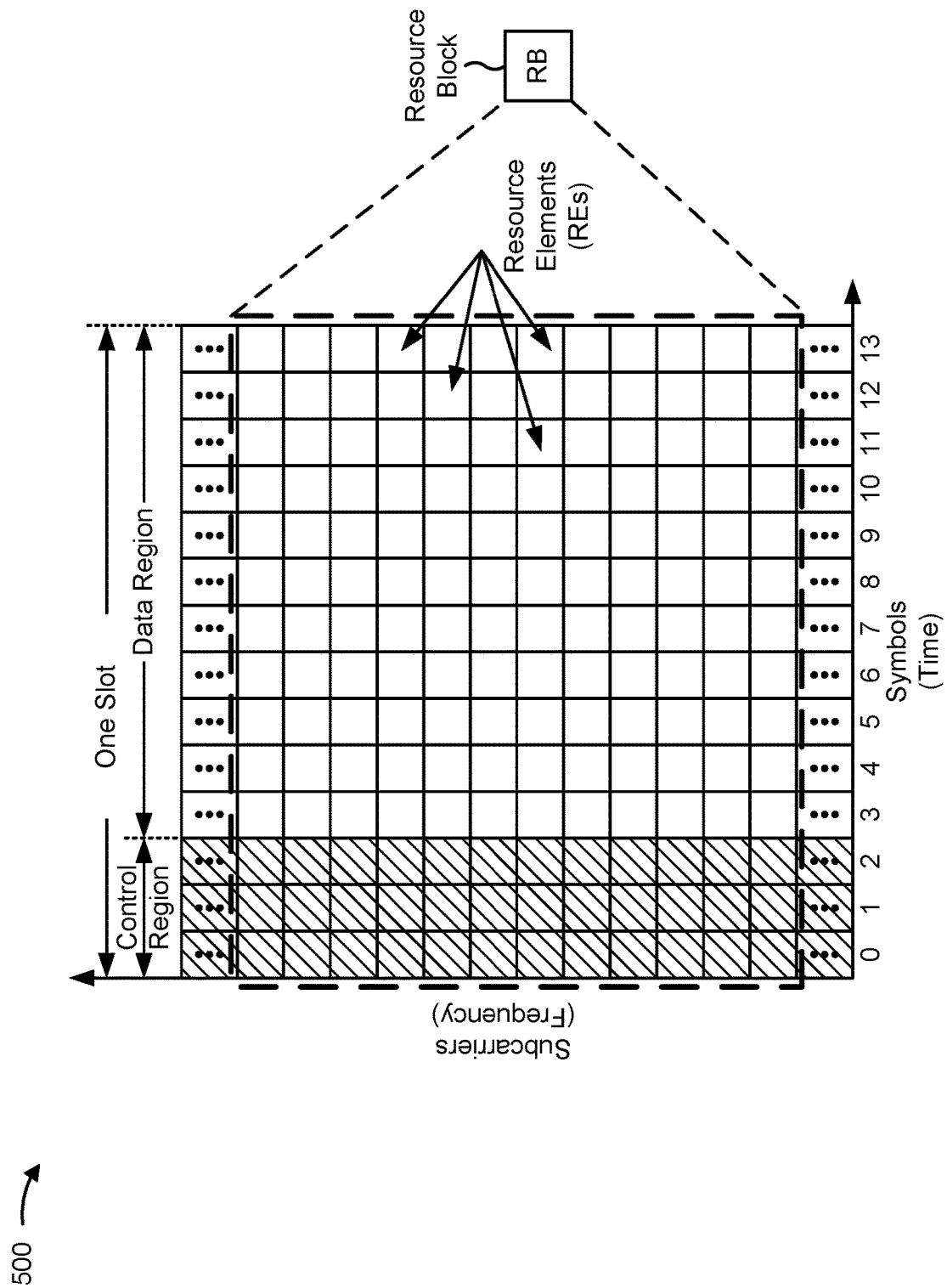
FIG. 5 is a diagram illustrating an example of a slot format, in accordance with the present disclosure.

FIG. 5 is a diagram illustrating an example 500 of a slot format, in accordance with the present disclosure. As shown in FIG. 5, time-frequency resources in a radio access network may be partitioned into resource blocks, shown by a single RB 505. An RB 505 is sometimes referred to as a physical resource block (PRB). An RB 505 includes a set of subcarriers (e.g., 12 subcarriers) and a set of symbols (e.g., 14 symbols) that are schedulable by a base station 110 as a unit. In some aspects, an RB 505 may include a set of subcarriers in a single slot. As shown, a single time-frequency resource included in an RB 505 may be referred to as a resource element (RE) 510. An RE 510 may include a single subcarrier (e.g., in frequency) and a single symbol (e.g., in time). A symbol may be referred to as an orthogonal frequency division multiplexing (OFDM) symbol. An RE 510 may be used to transmit one modulated symbol, which may be a real value or a complex value.

In some telecommunication systems (e.g., NR), RBs 505 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format). A slot may be configured with a link direction (e.g., downlink or uplink) for transmission. In some aspects, the link direction for a slot may be dynamically configured.

As indicated above, FIG. 5 is provided as an example. Other examples may differ from what is described with respect to FIG. 5.

NR sidelink may be used for various applications, such as V2X peer-to-peer safety messages. NR sidelink may involve two channel access modes. Mode 1 is for deployment within coverage of a base station (e.g., gNB), where a sidelink transmitter (e.g., UE) receives grants from the gNB for sidelink channel access. Mode 2 is for autonomous deployment, where a sidelink transmitter uses channel sensing to access a sidelink channel. A sidelink transmitter may transmit SCI for transmitting a transport block on one or two PSSCHs. A transmit resource, which may include a subchannel in a slot (e.g., symbol, frame slot) may be reserved for transmitting the transport block. Reserving the resource may involve autonomous sensing, or sensing as determined by the UE.

NR sidelink may support other network topologies, such as a hub UE serving as a traffic source for multiple peripheral UEs. Such topologies may have nodes that do not use licensed spectrum. NR sidelink may be used in a 5 GHz/6 GHz unlicensed band, and a UE may perform an LBT procedure to make sure a sidelink subchannel is clear before a transport block is transmitted on the sidelink subchannel. If a subchannel is not clear, there may be an LBT counter that backs off use of the subchannel, and the LBT counter may count down by slots or by time. The UE may not transmit a transport block on the subchannel until after an LBT countdown has been completed. The UE may estimate an LBT completion time and begin a resource selection window (future slots for selected transmit resources) based at least in part on the estimated LBT completion time.

Figure 6:
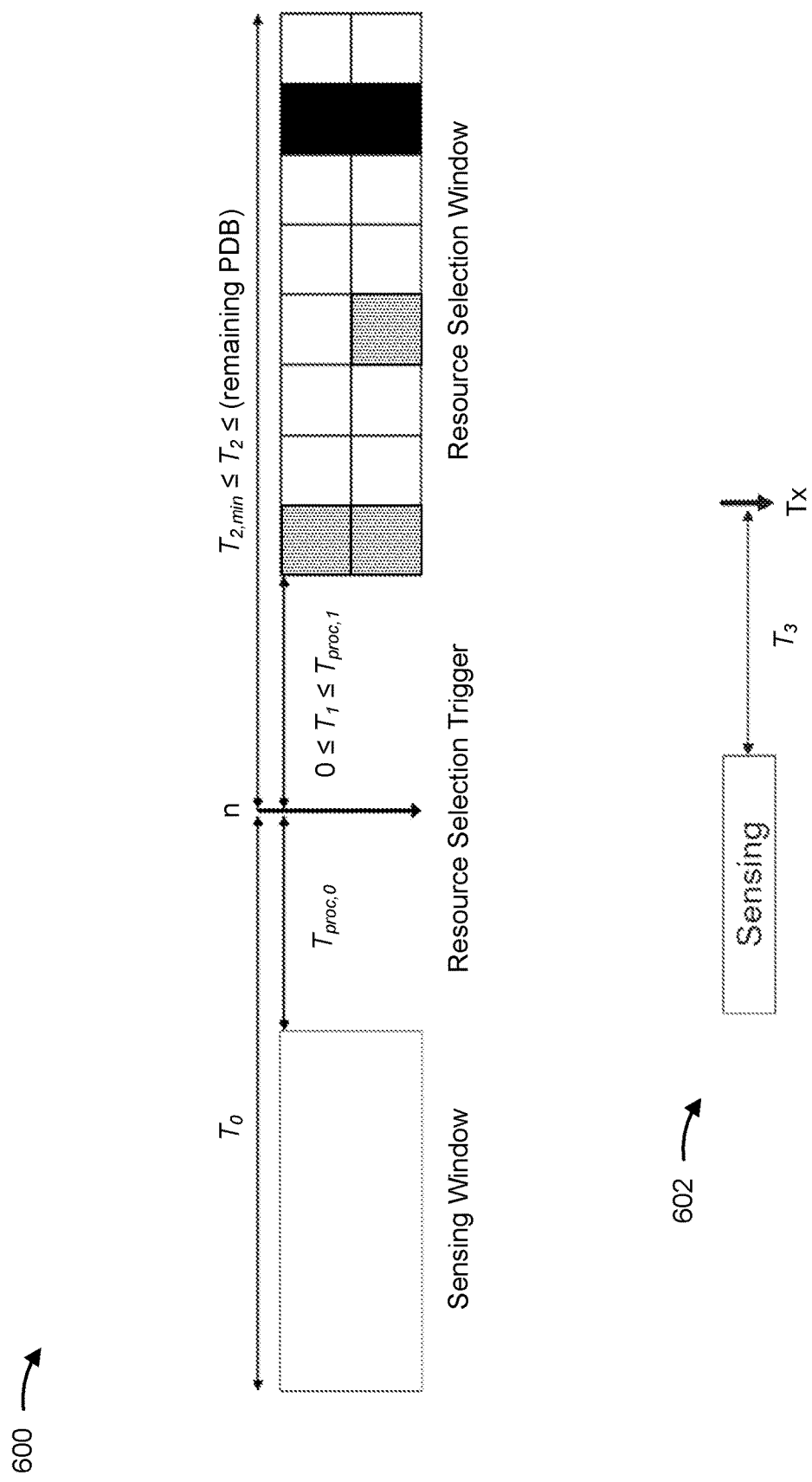
FIG. 6 is a diagram illustrating examples of autonomous sensing, in accordance with the present disclosure.

FIG. 6 is a diagram illustrating examples 600, 602 of autonomous sensing, in accordance with the present disclosure. Example 600 shows a timeline of a sensing window for sensing subchannels up to a resource selection trigger at time n for starting selection of resources inside a resource selection window. A beginning of the sensing window up to time n includes a time duration $T_0$. There are two time durations $T_{proc,0}$ and $T_1$ that allow for processing. A time $T_2$ for resource selection follows time n, and a length of $T_2$ may depend on a remaining packet delay budget (PDB).

When a resource selection is triggered at time n, a physical (PHY) layer of a UE examines the sensing window to determine a set of candidate resources for the upcoming resource selection window. The PHY layer may report the set of candidate resources to a medium access control (MAC) layer of the UE. The MAC layer may randomly select a transmit resource from the set of candidate resources for transmitting a transport block (e.g., MAC protocol data unit). The MAC layer may also randomly select (or reserve) later transmit resources for HARQ retransmissions of the transport block, one at a time, on one or more PSSCHs.

Mode 2 sidelink transmission may involve continuously sensing a channel up to a specified minimum time $T_3$ before actual transmission of a transport block on a selected transmit resource. This may include at least a second sensing of a transmit resource, and the second sensing may be referred to as a "last-minute" reevaluation of the transmit resource. A UE (MAC layer) may request a PHY layer to update candidate resources at this time, to double check whether a coming transmit resource and other reserved transmit resources are still clear. The PHY layer may respond to the MAC layer with a set of candidate resources that are available (still clear). If the coming transmit resource is no longer clear, the PHY layer may set a reselection flag for the MAC layer, which may reselect a transmit resource from among the newly provided candidate resources. This may lead to a new $T_3$ based reevaluation. Otherwise, the PHY layer expects to transmit the transport block on the selected transmit resource.

As indicated above, FIG. 6 provides some examples. Other examples may differ from what is described with regard to FIG. 6.

Figure 7:
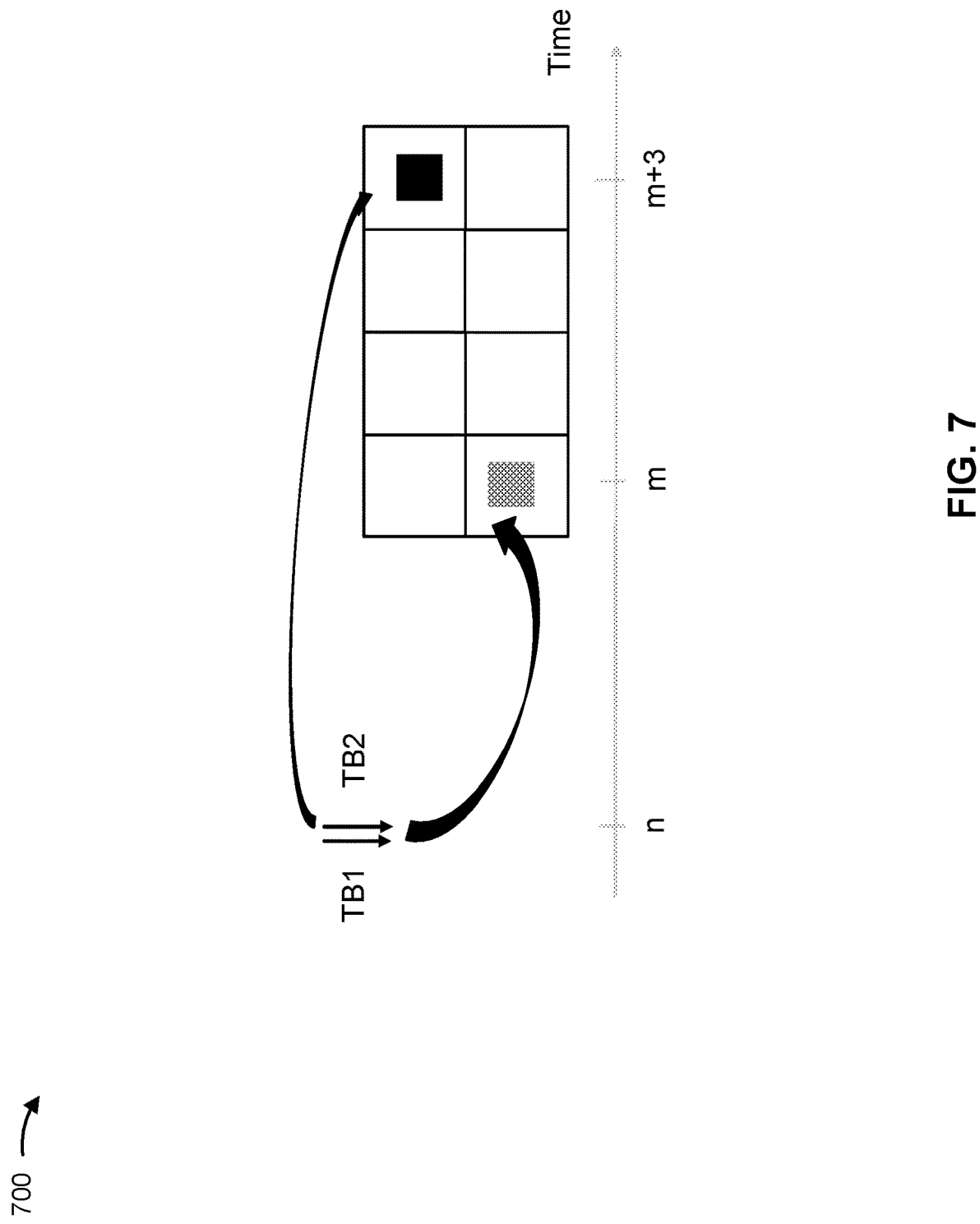
FIG. 7 is a diagram illustrating an example of selecting transmit resources for two transport blocks, in accordance with the present disclosure.

FIG. 7 is a diagram illustrating an example 700 of selecting transmit resources for two transport blocks, in accordance with the present disclosure. Example 700 shows reserved transmit resources for a first transport block (TB1) and a second transport block (TB2).

A UE may select a transmit resource for a single transport block based at least in part on an LBT completion time, but if there are multiple transport blocks, there can be an increase in latency. For example, TB1 and TB2 may arrive at the MAC layer of a UE at slot n, and the UE (MAC layer) may select subchannels on a sidelink channel at slots m and m+3 as transmit resources for TB1 and TB2, respectively. However, due to the random selection that normally occurs, there are empty slots between the transmit resources. The empty slots may cause the UE to perform a second LBT procedure, which consumes extra time and processing resources. The extra time and resources may become more prominent with a heavier traffic load.

As indicated above, FIG. 7 is provided as an example. Other examples may differ from what is described with regard to FIG. 7.

Figure 8:
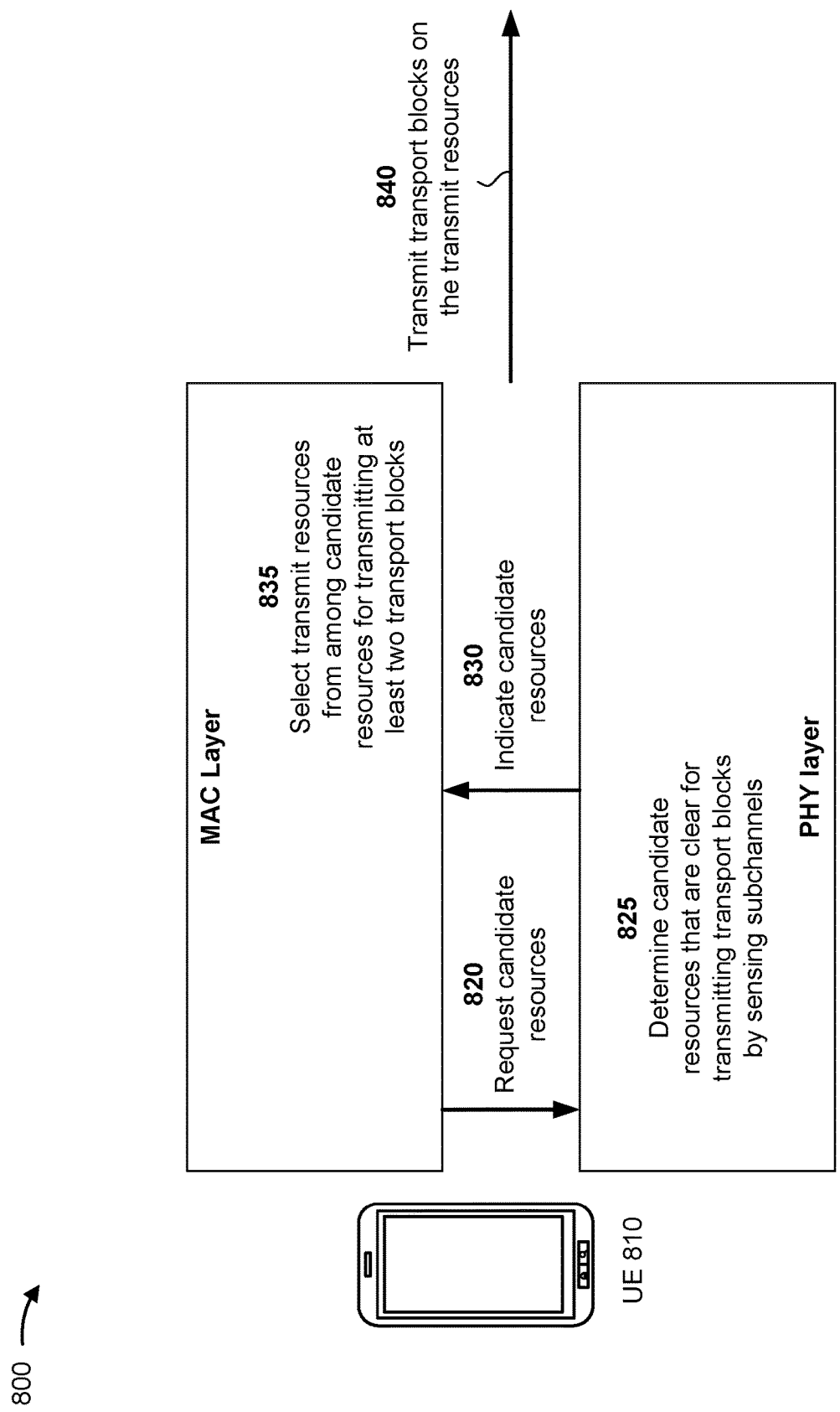
FIG. 8 is a diagram illustrating an example of sensing and transmitting multiple transport blocks for NR sidelink, in accordance with the present disclosure.

FIG. 8 is a diagram illustrating an example 800 of sensing and transmitting multiple transport blocks for NR sidelink, in accordance with the present disclosure. FIG. 8 shows representations of a MAC layer and a PHY layer of a UE 810 (e.g., a UE 120 depicted in FIGS. 1 and 2).

According to various aspects described herein, a UE, when using an unlicensed band for sidelink, may sense subchannels of one or more PSSCHs and select transmit resources such that at least two transport blocks are transmitted in separate subchannels of the same slot in a frequency division multiplexing (FDM) fashion. In some aspects, the UE may select transmit resources such that transport blocks are transmitted in contiguous slots of the same subchannel. Either way, there is no gap between transmit resources that could cause the UE to perform a second LBT procedure. As a result, the UE conserves time, power, and processing resources that would otherwise be consumed by a second LBT procedure.

As shown by reference number 820, the MAC layer of UE 810 may send a request for candidate resources to the PHY layer of UE 810. The MAC layer may indicate a quantity of transport blocks for which resources are requested and/or any LBT completion instants for subchannels.

As shown by reference number 825, the PHY layer may sense the subchannels and determine which candidate resources (subchannel and slot) are clear. The PHY layer may indicate the candidate resources to the MAC layer, as shown by reference number 830. The MAC layer may select transmit resources from among the candidate resources for transmitting transport blocks, as shown by reference number 835. The MAC layer may also reserve resources for retransmission.

In some aspects, there may be a "last-minute" reevaluation (second sensing) of the transmit resources to confirm that the transmit resources are still clear. If so, the UE (MAC and PHY layers) may transmit the transport blocks on the transmit resources, as shown by reference number 840. Note that this second sensing is a quick channel occupancy time check and not a full LBT procedure with a backoff countdown.

As indicated above, FIG. 8 is provided as an example. Other examples may differ from what is described with regard to FIG. 8.

Figure 9:
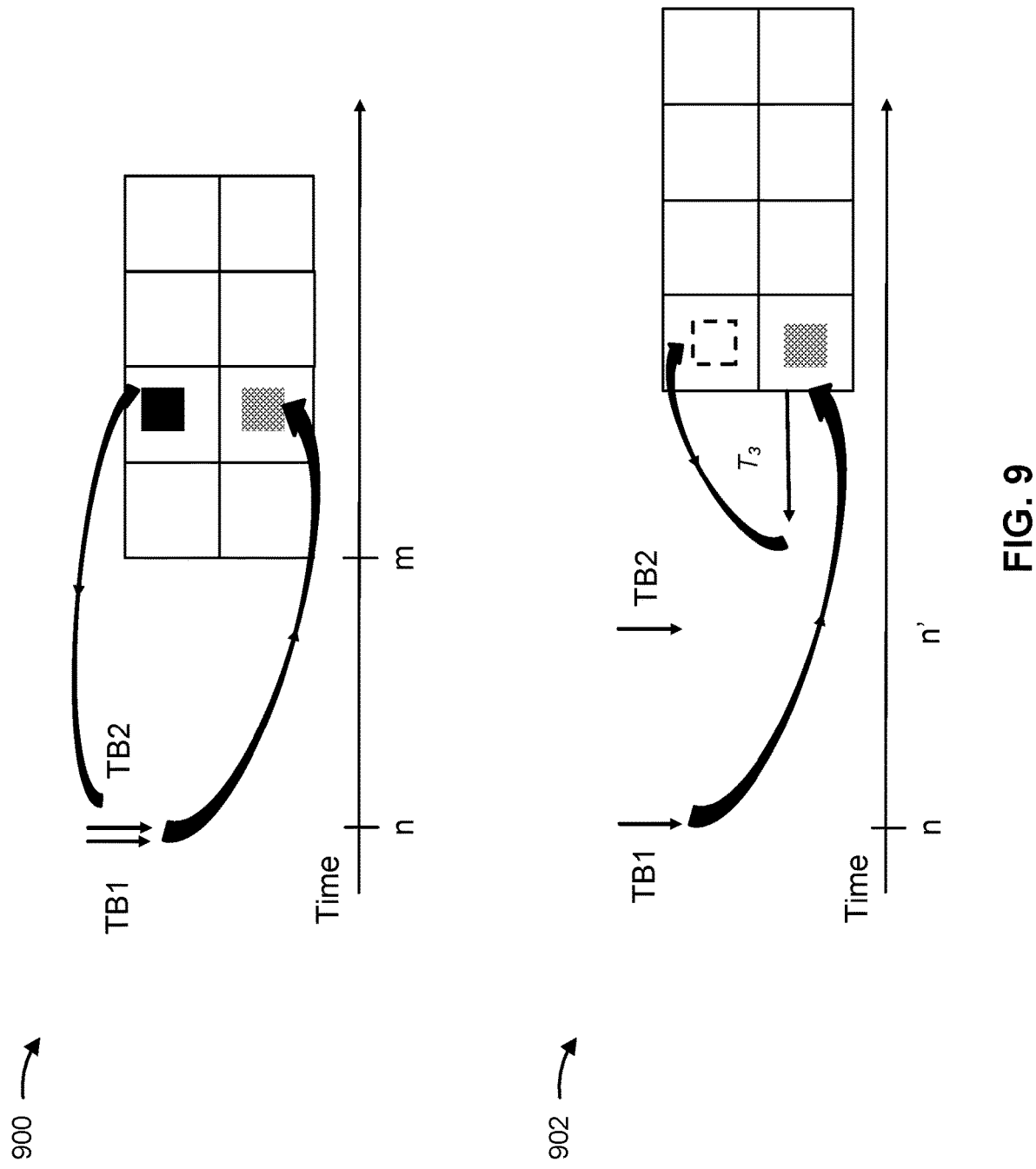
FIG. 9 is a diagram illustrating examples of sensing and transmitting multiple transport blocks for NR sidelink, in accordance with the present disclosure.

FIG. 9 is a diagram illustrating examples 900, 902 of sensing and transmitting multiple transport blocks for NR sidelink, in accordance with the present disclosure.

A UE may perform joint sensing for a quantity of transport blocks for up to the same quantity of sidelink subchannels. A MAC layer of the UE may obtain LBT completion instants for when an LBT backoff countdown is to be completed for respective subchannels. The quantity of LBT completion instants may be up to the quantity of transport blocks to be transmitted (and the quantity of subchannels). The MAC layer may send a sensing request to the PHY layer ahead of a resource selection window that will start no earlier than slot m, where a timing of slot m depends on the LBT completion instants. The sensing request may be for using a channel with enough subchannels for the transport blocks (N subchannels for N transport blocks).

The MAC layer may randomly select, from PSSCH candidate resources returned from the PHY layer, a transmit resource for a first transport block, where the transmit resource may be in a slot with multiple available subchannels. The MAC layer may then select other subchannels of the same slot as transmit resources for other transport blocks, such that the transport blocks are arranged in the same slot for FDM. Example 900 shows an example of transmit resources that are selected for TB1 and TB2 in the same slot for FDM. This purposeful placement of TB1 and TB2 is in contrast to a random selection of transmit resources that would normally occur for TB1 and TB2, which could create a gap between slots for TB1 and TB2.

Diverging from strict random selection may also allow for a "last-minute" selection of a transmit resource in the same slot. Example 902 shows that a transmit resource is selected for TB1 that arrives at slot n. TB2 may have arrived late at slot n', but due to a "last-minute" reevaluation for TB1, a candidate resource is known to be clear in the same slot as the transmit resource for TB1. Therefore, the UE may select the transmit resource for late arrival TB2 to be in the same slot as TB1, thus preventing TB2 having to wait for a much later slot and undergoing another LBT procedure. In some aspects, the transmit resource for TB2 may be in a subsequent adjacent slot, so as to be placed with TB1 in back-to-back slots in a time division multiplexing (TDM) fashion.

In some aspects, the UE may determine parameters for sensing and selecting transmit resources from stored configuration information, a system information block (SIB), and/or a radio resource control (RRC) message. For example, N may have a set maximum, or N may be limited as a function of a CBR, so that N decreases if subchannels tend to be busier. In some aspects, to avoid collisions, a greater value of N may shift slot m later in time. In some aspects, the UE (MAC layer) may specify priorities (e.g., low, median, mean, same, high) for transport blocks in the sensing request. The MAC layer may select transmit resources first for higher priority transport blocks.

As indicated above, FIG. 9 provides some examples. Other examples may differ from what is described with regard to FIG. 9.

Figure 10:
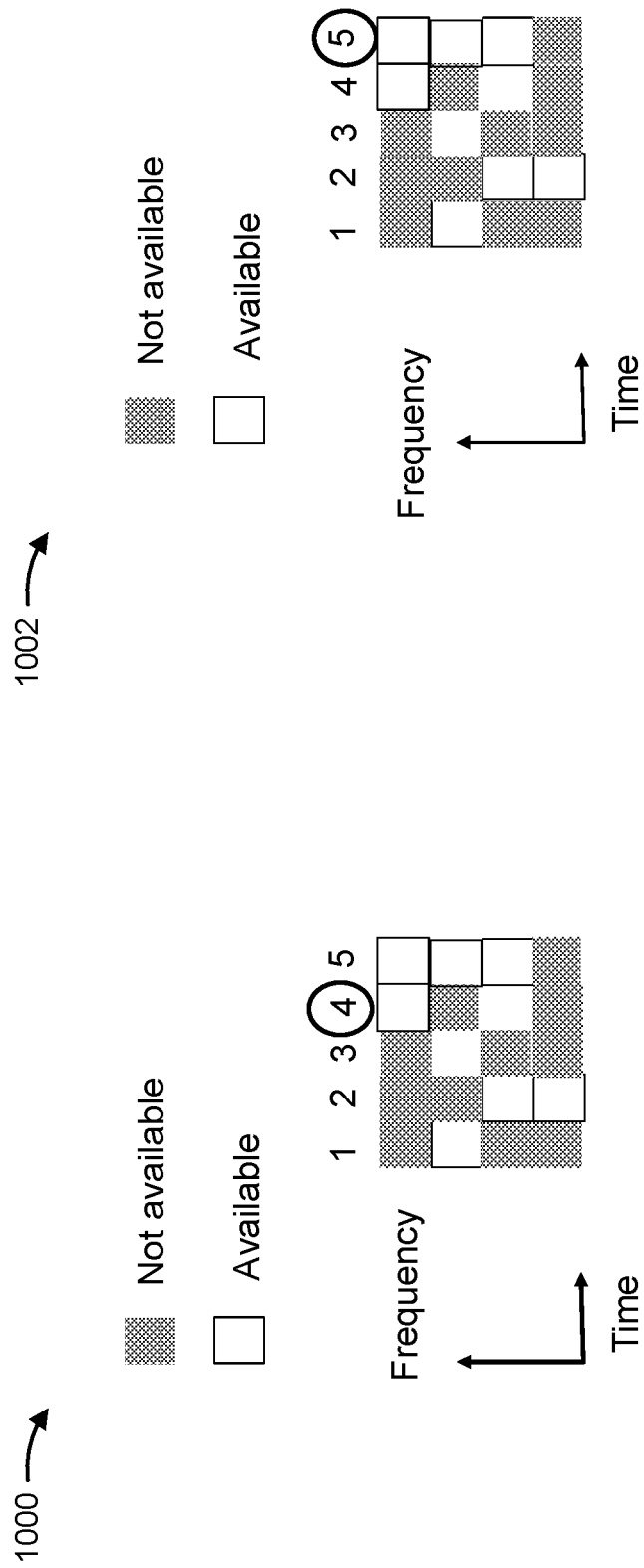
FIG. 10 is a diagram illustrating examples of sensing and transmitting multiple transport blocks for NR sidelink, in accordance with the present disclosure.

FIG. 10 is a diagram illustrating examples 1000, 1002 of sensing and transmitting multiple transport blocks for NR sidelink, in accordance with the present disclosure.

In some aspects, the MAC layer may send a sensing request to the PHY layer for a quantity of subchannels that is based at least in part on a greatest common divisor of a quantity of subchannels that may be available for transport blocks. In other words, if the MAC layer is screening for two transport blocks, the PHY layer may return candidate resources in slots that have at least two clear subchannels. In some aspects, the sensing request may ask for resources that are at least a specified amount (e.g., percentage) of a resource selection window (e.g., greater than 20%). In some aspects, the MAC layer may filter or screen candidate resources for slots that have at least the same quantity of clear subchannels as transport blocks to be submitted. Example 1000 shows that slots 2, 4, and 5, from among five slots of candidate resources, have at least two clear subchannels. The MAC layer may randomly select transmit resources from slots 2, 4, and 5. As shown in FIG. 10, the MAC layer may randomly select slot 4 for transmit resources for the two transport blocks.

In some aspects, the MAC layer may specify in a sensing request, or may screen for, a slot with contiguous subchannels that are clear. Example 1002 shows that slot 5 has at least two contiguous clear subchannels. Therefore, the MAC layer may select two of the three clear subchannels in slot 5 as transmit resources for the two transport blocks.

As indicated above, FIG. 10 provides some examples. Other examples may differ from what is described with regard to FIG. 10.

Figure 11:
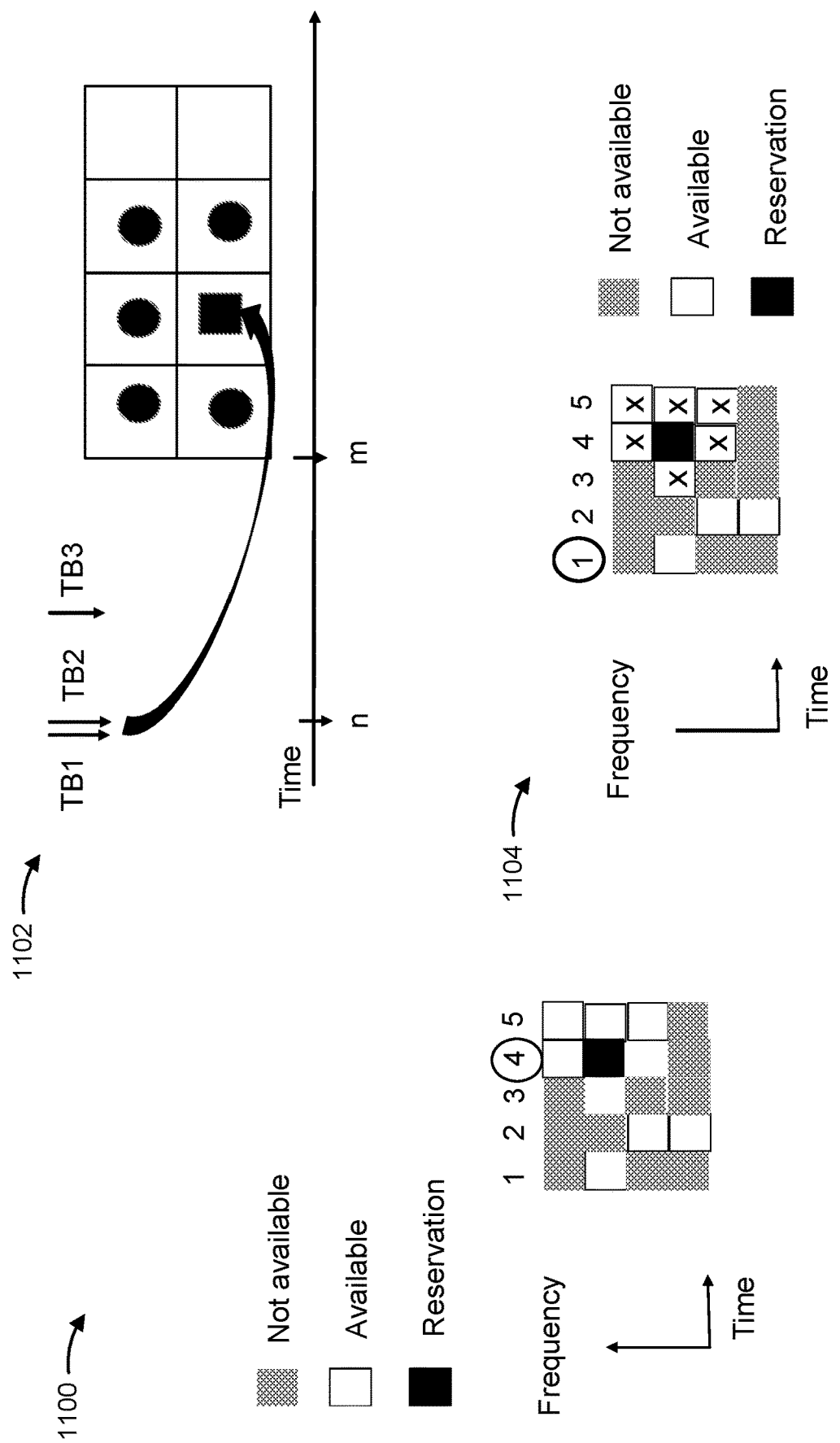
FIG. 11 is a diagram illustrating examples of sensing and transmitting multiple transport blocks for NR sidelink, in accordance with the present disclosure.

FIG. 11 is a diagram illustrating examples 1100, 1102, 1104 of sensing and transmitting multiple transport blocks for NR sidelink, in accordance with the present disclosure.

In some aspects, the UE (MAC layer) may be aware of an existing reserved resource when selecting transmit resources. The reserved resource may be reserved for a retransmission of a transport block. The MAC layer may cluster other transmit resources around the reserved resource. Clustering around the reserved resource may reduce a need to perform another LBT procedure. Example 1100 shows a reserved resource in slot 4. The MAC layer may select slot 4 and select transmit resources on either side of the reserved resource in slot 4, such that transmit resources in slot 4 are arranged for FDM. In some aspects, the MAC layer may select a transmit resource in slot 5 that is in the same subchannel as the reserved resource, such that transmit resources in the subchannel are arranged in back-to-back TDM fashion. In some aspects, transmit resource selection that is aware of reserved resources may be configured (e.g., via stored configuration information, an SIB, or an RRC message) for only high priority transport blocks or only for a given CBR range.

In some aspects, the MAC layer may cluster transmit resources around a previously selected resource, such as a transmit resource for an early arrival transport block that triggered sensing and resource selection. Example 1102 shows a square in a previously selected transmit resource for early arrival TB1. Sensing is requested of the PHY layer for TB2, and the PHY layer returns candidate resources (circles) that surround the previously selected resource (square). The MAC layer may select one of these candidate resources as a transmit resource for TB2. If TB3 arrives late, the MAC layer may select a transmit resource that is clustered around the transmit resources for TB1 and TB2, such that transmit resources for TB1, TB2, and TB3 are clustered in some combination of FDM and/or back-to-back TDM.

In some aspects, multiple transport blocks may need to be separated in time and/or frequency. This may require an anti-cluster arrangement of transmit resources. Example 1104 shows a reserved resource and how the MAC layer is not to select any transmit resource in slots 3-5 clustered around the reserved resource. For example, if one transport block is to be transmitted, the MAC layer may randomly select a transmit resource in slot 1 or slot 2. Example 1104 shows that the MAC layer has selected the transmit resource in slot 1.

As indicated above, FIG. 11 provides some examples. Other examples may differ from what is described with regard to FIG. 11.

Figure 12:
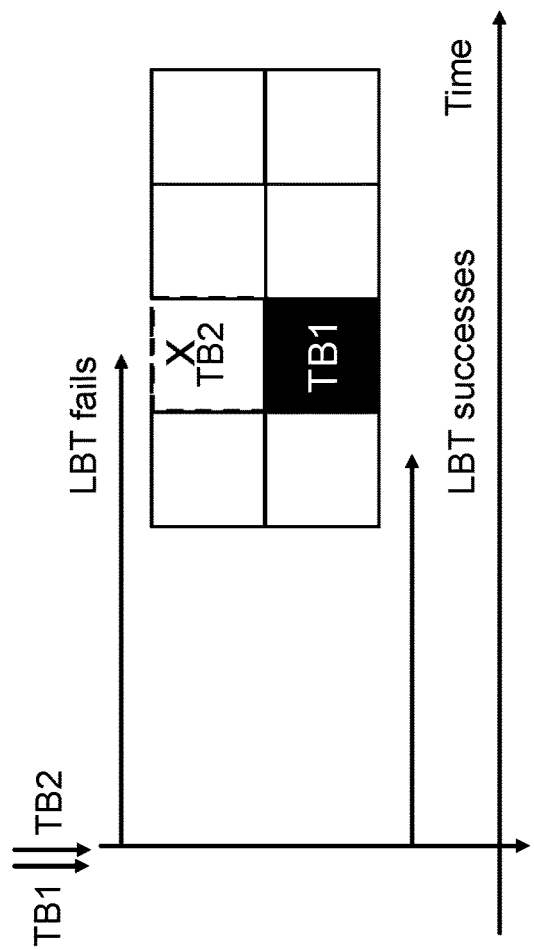
FIG. 12 is a diagram illustrating an example of sensing and transmitting multiple transport blocks for NR sidelink, in accordance with the present disclosure.

FIG. 12 is a diagram illustrating an example 1200 of sensing and transmitting multiple transport blocks for NR sidelink, in accordance with the present disclosure.

Various aspects described herein involve multiple transport blocks rather than single transport blocks. Accordingly, a UE may perform multiple LBT procedures in parallel for respective transport blocks that are to use transmit resources in an FDM fashion. The UE may transmit those transport blocks for which an LBT procedure is successful. Example 1200 shows that parallel LBT procedures are performed for TB1 and TB2, which are to be transmitted in a same slot for FDM. However, only TB1 will be transmitted, as the LBT procedure for TB2 failed, and the LBT counter for TB2 has not completed by the time the slot in the resource selection window is to be transmitted. Transport blocks with different LBT priorities (channel access priority classes (CAPCs)) may have transmit resources in a same slot.

As indicated above, FIG. 12 is provided as an example. Other examples may differ from what is described with regard to FIG. 12.

Figure 13:
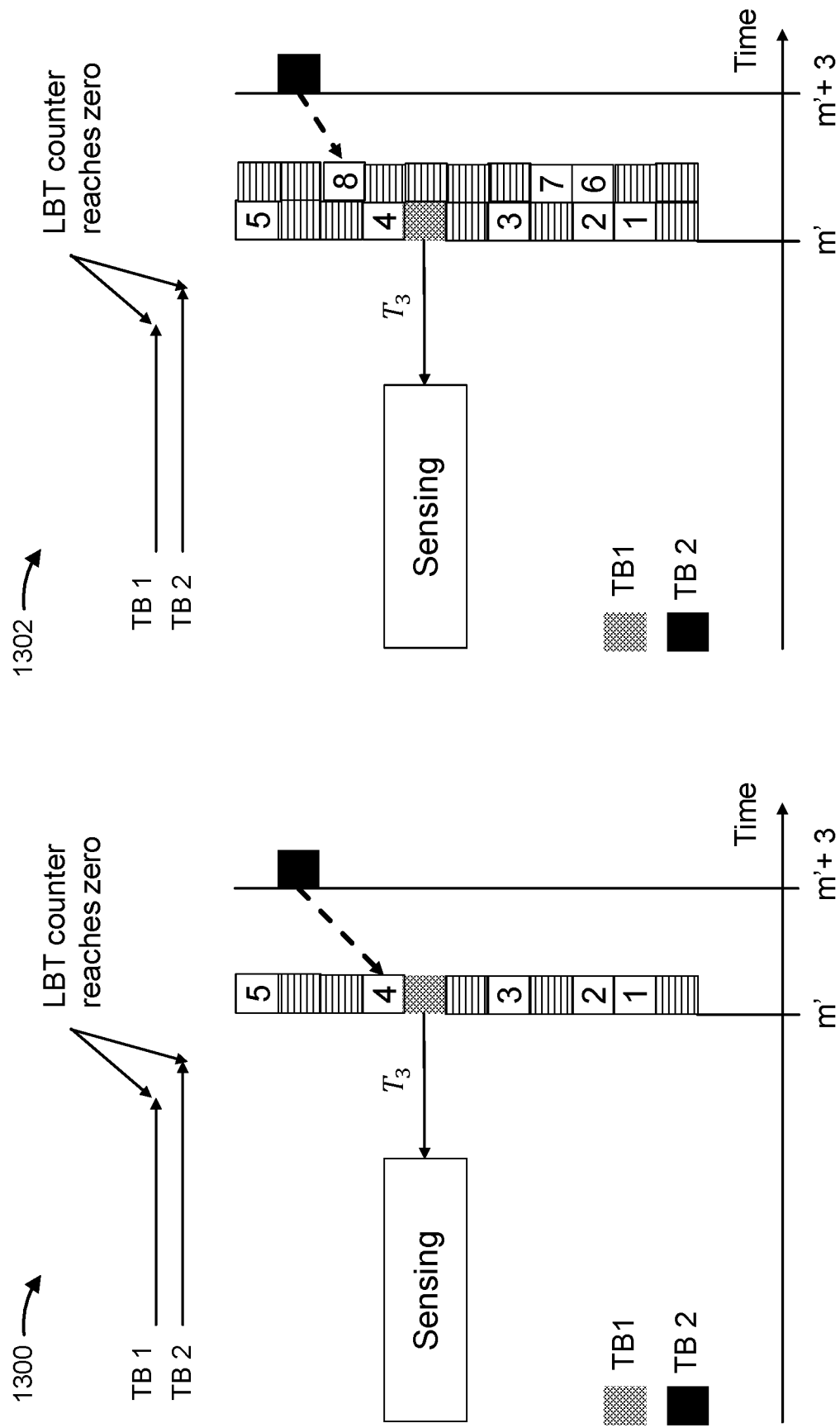
FIG. 13 is a diagram illustrating examples of sensing and transmitting multiple transport blocks for NR sidelink, in accordance with the present disclosure.

FIG. 13 is a diagram illustrating examples 1300, 1302 of sensing and transmitting multiple transport blocks for NR sidelink, in accordance with the present disclosure.

When identifying available resources as part of a "last-minute" reevaluation at a specified minimum time ($T_3$) ahead of actual transmission of a transport block, the MAC layer may opportunistically use a subset of available resources for another transport block for which an LBT counter is completed. Example 1300 shows that for a "last-minute" reevaluation by the PHY layer for a transmit resource at slot m' for TB1, there is a subset of resources (transmit resources 1-5) that are available. Therefore, if TB2 arrives late, the MAC layer may select a transmit resource (e.g., resource 4) at slot m (FDM with TB1) rather than later at slot m+3, which was an original random selection for TB2. Moving TB2 into an earlier transmit resource (if an LBT counter for TB2 is zero) may save what may have been another LBT procedure.

There are multiple uses for the subset of resources identified by the "last-minute" reevaluation, and some of these uses may involve reserved resources rather than resources for new initial transmissions. In some aspects, TB1 may have a reserved transmit resource on a PSSCH, such as for a retransmission, and TB2 may require a new transmit resource on the PSSCH. In some aspects, TB1 and TB2 may have reserved transmit resources on the PSSCH, but early transmission of TB2 may be allowed only if a time domain interval between reservations is smaller than a threshold time (as a penalty corresponding to an over the air reservation).

In some aspects, the UE may use additional collision protocols on top of LBT and autonomous sensing, so as to avoid collisions from early insertion ("jump-in") of a later transport block into a transmit resource. For example, a UE may generate a number t for each candidate transport block for early insertion up to a count of T, which has a value that is based at least in part on priorities of transport block candidates, a current CBR, an LBT type (sense initiator or resource sharer), and/or the like. A transport block that has a number t that is within the range of T may be inserted into a transmit resource of the subset of resources.

Example 1302 shows that the subset of resources may include multiple slots, where a quantity of slots (or symbols) may be less than a channel occupancy time (COT) for sensing. There may be no reservation (or no equal or higher priority reservation) that prevents the UE from continuously transmitting over a specified quantity of symbols (if needed). In this case, TB2 does not need to be arranged for FDM with TB1. For instance, TB2 in example 1302 may use available transmit resource number 8, in FIG. 13.

In some aspects, the UE may not be restricted by an LBT counter. For example, the UE may use the subset of resources for a new transport block arrival whose LBT counter has not yet completed (not reached zero). To counter this aggressive approach, the new transport block may be assigned to use a larger value T' than for a transport block with an LBT counter that has been completed, when using an advance collision avoidance protocol. This is particularly appropriate when the new transport block has no lower CAPC value than an original transport block.

As a result of the various procedures described above, the UE may more efficiently use transmit resources for multiple transport blocks. This may save the UE having to perform additional LBT procedures that consume time, power, processing resources, and signaling resources.

As indicated above, FIG. 13 provides some examples. Other examples may differ from what is described with regard to FIG. 13.

Figure 14:
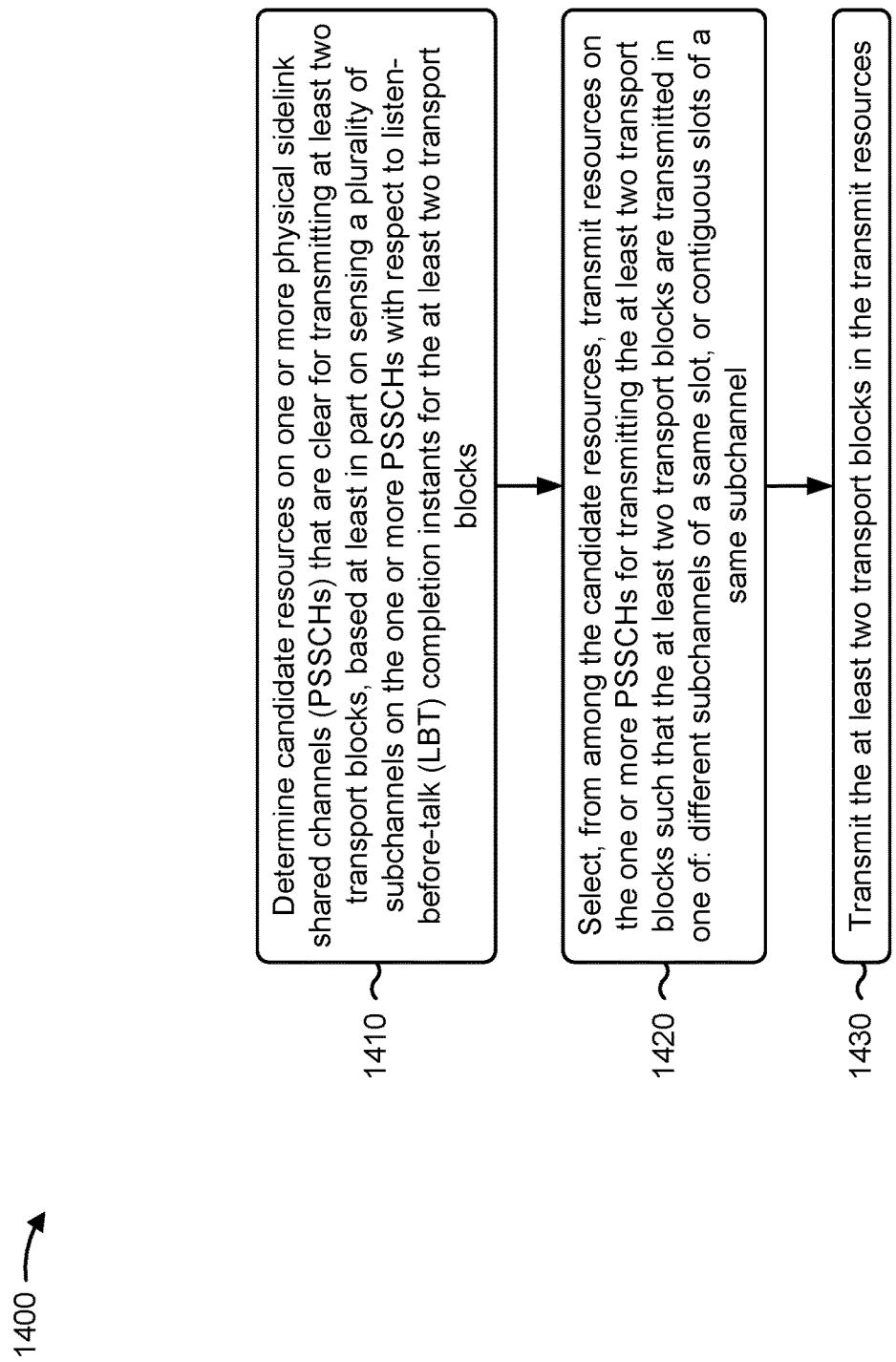
FIG. 14 is a diagram illustrating an example process performed, for example, by a UE, in accordance with the present disclosure.

FIG. 14 is a diagram illustrating an example process 1400 performed, for example, by a UE, in accordance with the present disclosure. Example process 1400 is an example where the UE (e.g., a UE 120 depicted in FIGS. 1 and 2, UE 810 depicted in FIG. 8) performs operations associated with sensing and transmitting multiple transport blocks for NR sidelink.

As shown in FIG. 14, in some aspects, process 1400 may include determining candidate resources on one or more PSSCHs that are clear for transmitting at least two transport blocks, based at least in part on sensing a plurality of subchannels on the one or more PSSCHs with respect to LBT completion instants for the at least two transport blocks (block 1410). For example, the UE (e.g., using antenna 252, demodulator 254, MIMO detector 256, receive processor 258, transmit processor 264, TX MIMO processor 266, modulator 254, controller/processor 280, and/or memory 282) may determine candidate resources on one or more PSSCHs that are clear for transmitting at least two transport blocks, based at least in part on sensing a plurality of subchannels on the one or more PSSCHs with respect to LBT completion instants for the at least two transport blocks, as described above.

As further shown in FIG. 14, in some aspects, process 1400 may include selecting, from among the candidate resources, transmit resources on the one or more PSSCHs for transmitting the at least two transport blocks, such that the at least two transport blocks are transmitted in one of: different subchannels of a same slot, or contiguous slots of a same subchannel (block 1420). For example, the UE (e.g., using antenna 252, demodulator 254, MIMO detector 256, receive processor 258, transmit processor 264, TX MIMO processor 266, modulator 254, controller/processor 280, and/or memory 282) may select, from among the candidate resources, transmit resources on the one or more PSSCHs for transmitting the at least two transport blocks such that the at least two transport blocks are transmitted in one of: different subchannels of a same slot, or contiguous slots of a same subchannel, as described above.

As further shown in FIG. 14, in some aspects, process 1400 may include transmitting the at least two transport blocks in the transmit resources (block 1430). For example, the UE (e.g., using antenna 252, transmit processor 264, TX MIMO processor 266, modulator 254, controller/processor 280, and/or memory 282) may transmit the at least two transport blocks in the transmit resources, as described above.

Process 1400 may include additional aspects, such as any single aspect or any combination of aspects described below and/or in connection with one or more other processes described elsewhere herein.

In a first aspect, determining the candidate resources includes a PHY layer of the UE determining the candidate resources based at least in part on a request from a MAC layer of the UE, where the PHY layer indicates the candidate resources to the MAC layer, and selecting the transmit resources includes the MAC layer selecting the transmit resources.

In a second aspect, alone or in combination with the first aspect, a quantity of the at least two transport blocks to be transmitted is limited based at least in part on a CBR, stored configuration information, an indication in a SIB, an indication in an RRC message, or some combination thereof.

In a third aspect, alone or in combination with one or more of the first and second aspects, a time to start transmitting the at least two transport blocks is based at least in part on a quantity of the at least two transport blocks to be transmitted.

In a fourth aspect, alone or in combination with one or more of the first through third aspects, selecting the transmit resources for transmitting the at least two transport blocks includes selecting the transmit resources for the at least two transport blocks based at least in part on priorities of the at least two transport blocks.

In a fifth aspect, alone or in combination with one or more of the first through fourth aspects, selecting the transmit resources for transmitting the at least two transport blocks includes randomly selecting the transmit resources such that the at least two transport blocks are transmitted in different subchannels of a same slot.

In a sixth aspect, alone or in combination with one or more of the first through fifth aspects, selecting the transmit resources for transmitting the at least two transport blocks includes selecting one or more slots that each have a quantity of clear subchannels equal to or greater than a quantity of the at least two transport blocks.

In a seventh aspect, alone or in combination with one or more of the first through sixth aspects, a quantity of subchannels to sense for the one or more slots is a greatest common divisor of a quantity of subchannels for the at least two transport blocks.

In an eighth aspect, alone or in combination with one or more of the first through seventh aspects, selecting the transmit resources for transmitting the at least two transport blocks includes selecting transmit resources for the at least two transport blocks that have at least a specified amount of resource availability with respect to a resource selection window.

In a ninth aspect, alone or in combination with one or more of the first through eighth aspects, selecting the one or more slots includes determining which slots have contiguous subchannels that are clear.

In a tenth aspect, alone or in combination with one or more of the first through ninth aspects, selecting the transmit resources for transmitting the at least two transport blocks includes selecting the transmit resources from among contiguous candidate resources that are adjacent to a previously reserved transmit resource or a transmit resource used for a previous transport block.

In an eleventh aspect, alone or in combination with one or more of the first through tenth aspects, selecting the transmit resources for transmitting the at least two transport blocks includes selecting a transmit resource from among contiguous candidate resources that are not adjacent to a previously reserved transmit resource or a transmit resource used for a previous transport block.

In a twelfth aspect, alone or in combination with one or more of the first through eleventh aspects, selecting the transmit resources for transmitting the at least two transport blocks includes selecting transmit resources for the at least two transport blocks independent of a quantity of retransmissions for each of the at least two transport blocks.

In a thirteenth aspect, alone or in combination with one or more of the first through twelfth aspects, process 1400 includes sensing, for a second time, at least one resource of the transmit resources at a specified minimum time before transmitting a transport block in the at least one resource, where transmitting the at least two transport blocks includes transmitting the transport block in the at least one resource based at least in part on a determination that the at least one resource is still clear after sensing the at least one resource for the second time.

In a fourteenth aspect, alone or in combination with one or more of the first through thirteenth aspects, process 1400 includes performing a collision avoidance procedure for the at least one resource.

In a fifteenth aspect, alone or in combination with one or more of the first through fourteenth aspects, process 1400 includes selecting the transport block for transmission in the at least one resource based at least in part on a random number assigned to the transport block, and the random number being within a range of numbers for selection.

In a sixteenth aspect, alone or in combination with one or more of the first through fifteenth aspects, the at least one resource includes a plurality of slots.

In a seventeenth aspect, alone or in combination with one or more of the first through sixteenth aspects, process 1400 includes performing LBT procedures in parallel for the at least two transport blocks on at least two subchannels for a same slot, and transmitting the at least two transport blocks includes transmitting transport blocks of the at least two transport blocks whose LBT procedure is successful.

In an eighteenth aspect, alone or in combination with one or more of the first through seventeenth aspects, process 1400 includes performing LBT procedures in parallel for the at least two transport blocks on subchannels for different slots, and transmitting the at least two transport blocks includes transmitting transport blocks whose LBT procedure is successful.

In a nineteenth aspect, alone or in combination with one or more of the first through eighteenth aspects, process 1400 includes switching transmit resources for a pair of transport blocks of the at least two transport blocks based at least in part on completion of an LBT counter for one of the transport blocks of the pair of transport blocks and non-completion of an LBT counter for the other one of the pair of transport blocks.

In a twentieth aspect, alone or in combination with one or more of the first through nineteenth aspects, process 1400 includes selecting, after sensing that a subset of the transmit resources are clear for a specified minimum time before transmitting the at least two transport blocks, a resource of the subset for transmitting another transport block with an LBT counter that is completed and that does not have a reserved transmit resource.

In a twenty-first aspect, alone or in combination with one or more of the first through twentieth aspects, process 1400 includes selecting, after sensing that a subset of the transmit resources not reserved for the at least two transport blocks are clear for a specified minimum time before transmitting the at least two transport blocks, a resource of the subset for transmitting one of the at least two transport blocks that has an LBT counter that is completed, where the resource of the subset is in an earlier slot than an original reserved timing resource for the one of the at least two transport blocks.

In a twenty-second aspect, alone or in combination with one or more of the first through twenty-first aspects, process 1400 includes selecting, after sensing that a subset of the transmit resources not reserved for the at least two transport blocks are clear for a specified minimum time before transmitting the at least two transport blocks, a resource of the subset for transmitting a transport block that has an LBT counter that is not completed.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
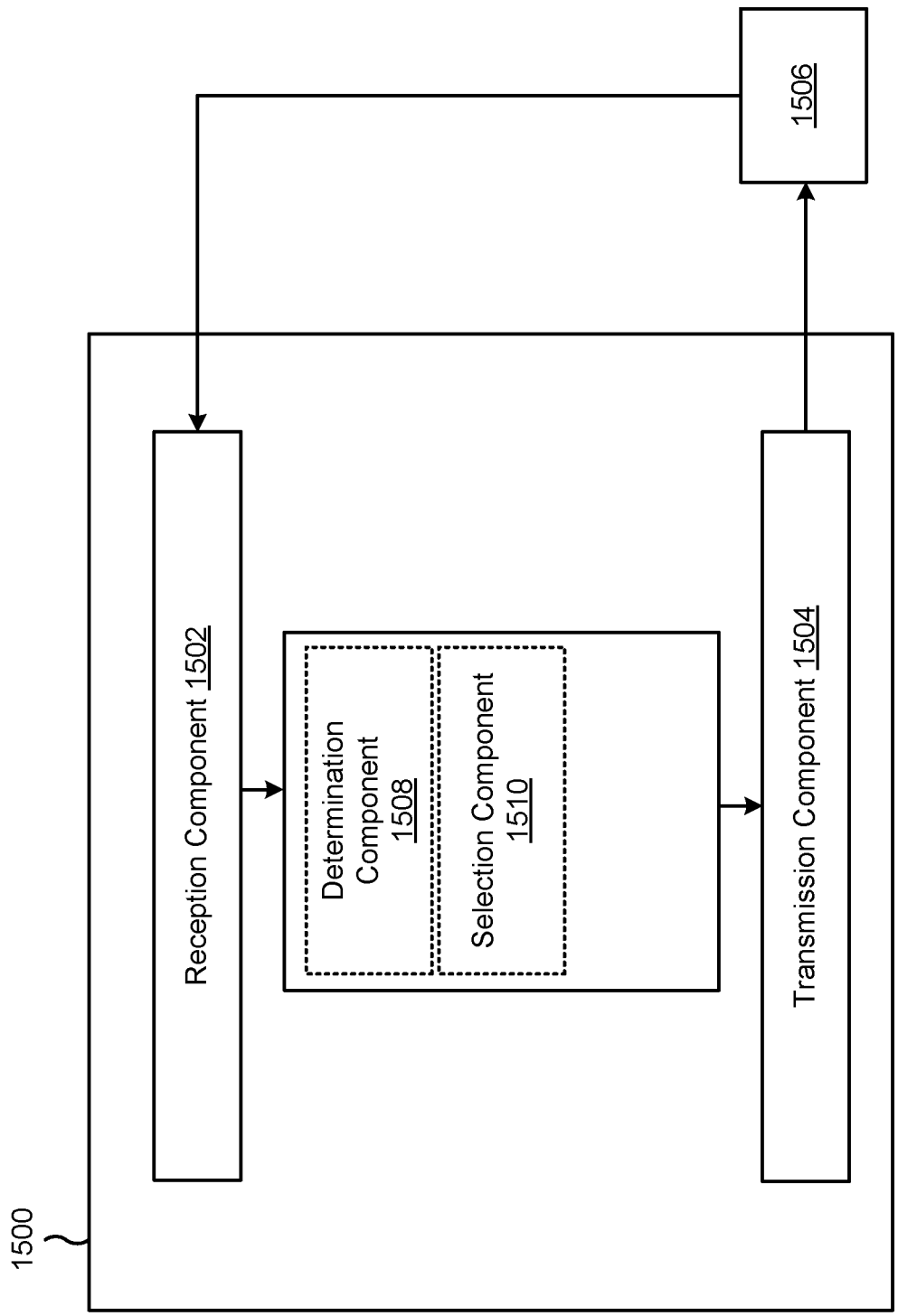
FIG. 15 is a block diagram of an example apparatus for wireless communication, in accordance with the present disclosure.

FIG. 15 is a block diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include one or more of a determination component 1508 or a selection component 1510, among other examples.

In some aspects, the apparatus 1500 may be configured to perform one or more operations described herein in connection with FIGS. 3-14. Additionally or alternatively, the apparatus 1500 may be configured to perform one or more processes described herein, such as process 1400 of FIG. 14, or a combination thereof. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be collocated with the reception component 1502 in a transceiver.

The determination component 1508 may determine candidate resources on one or more PSSCHs that are clear for transmitting at least two transport blocks, based at least in part on sensing a plurality of subchannels on the one or more PSSCHs with respect to LBT completion instants for the at least two transport blocks. In some aspects, the determination component 1508 may include a controller/processor, a memory, or a combination thereof, of the UE described above in connection with FIG. 2. The selection component 1510 may select, from among the candidate resources, transmit resources on the one or more PSSCHs for transmitting the at least two transport blocks such that the at least two transport blocks are transmitted in one of: different subchannels of a same slot, or contiguous slots of a same subchannel. In some aspects, the selection component 1510 may a controller/processor, a memory, or a combination thereof, of the UE described above in connection with FIG. 2. The transmission component 1504 may transmit the at least two transport blocks in the transmit resources.

The determination component 1508 may include a memory. The determination component 1508 may include one or more processors coupled to the memory, one or more processors configured to determine candidate resources on one or more PSSCHs that are clear for transmitting at least two transport blocks, based at least in part on sensing a plurality of subchannels on the one or more PSSCHs with respect to LBT completion instants for the at least two transport blocks.

The selection component 1510 may include a memory. The selection component 1510 may include one or more processors coupled to the memory, the one or more processors configured to select, from among the candidate resources, transmit resources on the one or more PSSCHs for transmitting the at least two transport blocks such that the at least two transport blocks are transmitted in one of: different subchannels of a same slot, or contiguous slots of a same subchannel.

The determination component 1508 may include one or more instructions that, when executed by one or more processors of a UE, cause the UE to determine candidate resources on one or more PSSCHs that are clear for transmitting at least two transport blocks, based at least in part on sensing a plurality of subchannels on the one or more PSSCHs with respect to LBT completion instants for the at least two transport blocks.

The selection component 1510 may include one or more instructions that, when executed by one or more processors of a UE, cause the UE to select, from among the candidate resources, transmit resources on the one or more PSSCHs for transmitting the at least two transport blocks such that the at least two transport blocks are transmitted in one of: different subchannels of a same slot, or contiguous slots of a same subchannel.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: determining candidate resources on one or more physical sidelink shared channels (PSSCHs) that are clear for transmitting at least two transport blocks, based at least in part on sensing a plurality of subchannels on the one or more PSSCHs with respect to listen-before-talk (LBT) completion instants for the at least two transport blocks; selecting, from among the candidate resources, transmit resources on the one or more PSSCHs for transmitting the at least two transport blocks such that the at least two transport blocks are transmitted in one of: different subchannels of a same slot, or contiguous slots of a same subchannel; and transmitting the at least two transport blocks in the transmit resources.

Aspect 2: The method of Aspect 1, wherein determining the candidate resources includes a physical (PHY) layer of the UE determining the candidate resources based at least in part on a request from a medium access control (MAC) layer of the UE, wherein the PHY layer indicates the candidate resources to the MAC layer, and wherein selecting the transmit resources includes the MAC layer selecting the transmit resources.

Aspect 3: The method of Aspect 1 or 2, wherein a quantity of the at least two transport blocks to be transmitted is limited based at least in part on a channel busy ratio, stored configuration information, an indication in a system information block, an indication in a radio resource control message, or some combination thereof.

Aspect 4: The method of any of Aspects 1-3, wherein a time to start transmitting the at least two transport blocks is based at least in part on a quantity of the at least two transport blocks to be transmitted.

Aspect 5: The method of any of Aspects 1-4, wherein selecting the transmit resources for transmitting the at least two transport blocks includes selecting the transmit resources for the at least two transport blocks based at least in part on priorities of the at least two transport blocks.

Aspect 6: The method of any of Aspects 1-5, wherein selecting the transmit resources for transmitting the at least two transport blocks includes randomly selecting the transmit resources such that the at least two transport blocks are transmitted in different subchannels of a same slot.

Aspect 7: The method of Aspect 6, wherein selecting the transmit resources for transmitting the at least two transport blocks includes selecting one or more slots that each have a quantity of clear subchannels equal to or greater than a quantity of the at least two transport blocks.

Aspect 8: The method of Aspect 7, wherein a quantity of subchannels to sense for the one or more slots is a greatest common divisor of a quantity of subchannels for the at least two transport blocks.

Aspect 9: The method of Aspect 7 or 8, wherein selecting the transmit resources for transmitting the at least two transport blocks includes selecting transmit resources for the at least two transport blocks that have at least a specified amount of resource availability with respect to a resource selection window.

Aspect 10: The method of any of Aspects 7-9, wherein selecting the one or more slots includes determining which slots have contiguous subchannels that are clear.

Aspect 11: The method of any of Aspects 1-10, wherein selecting the transmit resources for transmitting the at least two transport blocks includes selecting the transmit resources from among contiguous candidate resources that are adjacent to a previously reserved transmit resource or a transmit resource used for a previous transport block.

Aspect 12: The method of any of Aspects 1-10, wherein selecting the transmit resources for transmitting the at least two transport blocks includes selecting a transmit resource from among contiguous candidate resources that are not adjacent to a previously reserved transmit resource or a transmit resource used for a previous transport block.

Aspect 13: The method of any of Aspects 1-12, wherein selecting the transmit resources for transmitting the at least two transport blocks includes selecting transmit resources for the at least two transport blocks independent of a quantity of retransmissions for each of the at least two transport blocks.

Aspect 14: The method of any of Aspects 1-13, further comprising sensing, for a second time, at least one resource of the transmit resources at a specified minimum time before transmitting a transport block in the at least one resource, wherein transmitting the at least two transport blocks includes transmitting the transport block in the at least one resource based at least in part on a determination that the at least one resource is still clear after sensing the at least one resource for the second time.

Aspect 15: The method of Aspect 14, further comprising performing a collision avoidance procedure for the at least one resource.

Aspect 16: The method of Aspect 14 or 15, further comprising selecting the transport block for transmission in the at least one resource based at least in part on a random number assigned to the transport block, and the random number being within a range of numbers for selection.

Aspect 17: The method of any of Aspects 14-16, wherein the at least one resource includes a plurality of slots.

Aspect 18: The method of any of Aspects 1-17, further comprising performing LBT procedures in parallel for the at least two transport blocks on at least two subchannels for a same slot, and wherein transmitting the at least two transport blocks includes transmitting transport blocks of the at least two transport blocks whose LBT procedure is successful.

Aspect 19: The method of any of Aspects 1-18, further comprising performing LBT procedures in parallel for the at least two transport blocks on subchannels for different slots, and wherein transmitting the at least two transport blocks includes transmitting transport blocks whose LBT procedure is successful.

Aspect 20: The method of Aspect 19, further comprising switching transmit resources for a pair of transport blocks of the at least two transport blocks based at least in part on completion of an LBT counter for one of the transport blocks of the pair of transport blocks and non-completion of an LBT counter for the other one of the pair of transport blocks.

Aspect 21: The method of any of Aspects 1-20, further comprising selecting, after sensing that a subset of the transmit resources are clear for a specified minimum time before transmitting the at least two transport blocks, a resource of the subset for transmitting another transport block with an LBT counter that is completed and that does not have a reserved transmit resource.

Aspect 22: The method of any of Aspects 1-21, further comprising selecting, after sensing that a subset of the transmit resources not reserved for the at least two transport blocks are clear for a specified minimum time before transmitting the at least two transport blocks, a resource of the subset for transmitting one of the at least two transport blocks that has an LBT counter that is completed, wherein the resource of the subset is in an earlier slot than an original reserved timing resource for the one of the at least two transport blocks.

Aspect 23: The method of any of Aspects 1-22, further comprising selecting, after sensing that a subset of the transmit resources not reserved for the at least two transport blocks are clear for a specified minimum time before transmitting the at least two transport blocks, a resource of the subset for transmitting a transport block that has an LBT counter that is not completed.

Aspect 24: An apparatus for wireless communication at a device, comprising a processor; memory coupled with the processor; and instructions stored in the memory and executable by the processor to cause the apparatus to perform the method of one or more of Aspects 1-23.

Aspect 25: A device for wireless communication, comprising a memory and one or more processors coupled to the memory, the one or more processors configured to perform the method of one or more of Aspects 1-23.

Aspect 26: An apparatus for wireless communication, comprising at least one means for performing the method of one or more of Aspects 1-23.

Aspect 27: A non-transitory computer-readable medium storing code for wireless communication, the code comprising instructions executable by a processor to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
obtain, at a medium access control (MAC) layer of the UE, a set of listen-before-talk (LBT) completion instants for at least two transport blocks, the set of LBT completion instants indicative of when at least one LBT backoff countdown is to be completed;
determine candidate resources on one or more physical sidelink shared channels (PSSCHs) that are clear for transmitting the at least two transport blocks, based at least in part on sensing a plurality of subchannels with respect to the set of LBT completion instants;
select, from among the candidate resources, transmit resources on the one or more PSSCHs for transmitting the at least two transport blocks such that the at least two transport blocks are transmitted in one of: different subchannels of a same slot, or contiguous slots of a same subchannel; and
transmit the at least two transport blocks in the transmit resources.

2. The UE of claim 1, wherein the one or more processors, to determine the candidate resources, are configured to determine, at a physical (PHY) layer of the UE, the candidate resources based at least in part on a request from the MAC layer, wherein the PHY layer indicates the candidate resources to the MAC layer, and wherein the one or more processors are configured to select the transmit resources at the MAC layer.

3. The UE of claim 1, wherein a quantity of the at least two transport blocks to be transmitted is limited based at least in part on at least one of:
a channel busy ratio,
stored configuration information,
an indication in a system information block, or
an indication in a radio resource control message.

4. The UE of claim 1, wherein a time to start transmitting the at least two transport blocks is based at least in part on a quantity of the at least two transport blocks to be transmitted.

5. The UE of claim 1, wherein the one or more processors, to select the transmit resources for transmitting the at least two transport blocks, are configured to select the transmit resources for the at least two transport blocks based at least in part on priorities of the at least two transport blocks.

6. The UE of claim 1, wherein the one or more processors, to select the transmit resources for transmitting the at least two transport blocks, are configured to randomly select the transmit resources such that the at least two transport blocks are transmitted in different subchannels of a same slot.

7. The UE of claim 6, wherein the one or more processors, to select the transmit resources for transmitting the at least two transport blocks, are configured to select one or more slots that each have a quantity of clear subchannels equal to or greater than a quantity of the at least two transport blocks.

8. The UE of claim 7, wherein a quantity of subchannels to sense for the one or more slots is a greatest common divisor of a quantity of subchannels for the at least two transport blocks.

9. The UE of claim 7, wherein the one or more processors, to select the transmit resources for transmitting the at least two transport blocks, are configured to select transmit resources for the at least two transport blocks that have at least a specified amount of resource availability with respect to a resource selection window.

10. The UE of claim 7, wherein the one or more processors, to select the one or more slots, are configured to determine which slots have contiguous subchannels that are clear.

11. The UE of claim 1, wherein the one or more processors, to select the transmit resources for transmitting the at least two transport blocks, are configured to select the transmit resources from among contiguous candidate resources that are adjacent to a previously reserved transmit resource or a transmit resource used for a previous transport block.

12. The UE of claim 1, wherein the one or more processors, to select the transmit resources for transmitting the at least two transport blocks, are configured to select a transmit resource from among contiguous candidate resources that are not adjacent to a previously reserved transmit resource or a transmit resource used for a previous transport block.

13. The UE of claim 1, wherein the one or more processors, to select the transmit resources for transmitting the at least two transport blocks, are configured to select transmit resources for the at least two transport blocks independent of a quantity of retransmissions for each of the at least two transport blocks.

14. The UE of claim 1, wherein the one or more processors are configured to sense, for a second time, at least one resource of the transmit resources at a specified minimum time before transmitting a transport block in the at least one resource, and wherein the one or more processors, to transmit the at least two transport blocks, are configured to transmit the transport block in the at least one resource based at least in part on a determination that the at least one resource is still clear after sensing the at least one resource for the second time.

15. The UE of claim 14, wherein the one or more processors are configured to perform a collision avoidance procedure for the at least one resource.

16. The UE of claim 14, wherein the one or more processors are configured to select the transport block for transmission in the at least one resource based at least in part on a random number assigned to the transport block, and the random number being within a range of numbers for selection.

17. The UE of claim 14, wherein the at least one resource includes a plurality of slots.

18. The UE of claim 1, wherein the one or more processors are configured to perform LBT procedures in parallel for the at least two transport blocks on at least two subchannels for a same slot, and wherein the one or more processors, to transmit the at least two transport blocks, are configured to transmit transport blocks of the at least two transport blocks whose LBT procedure is successful.

19. The UE of claim 1, wherein the one or more processors are configured to perform LBT procedures in parallel for the at least two transport blocks on subchannels for different slots, and wherein the one or more processors, to transmit the at least two transport blocks, are configured to transmit transport blocks whose LBT procedure is successful.

20. The UE of claim 19, wherein the one or more processors are configured to switch transmit resources for a pair of transport blocks of the at least two transport blocks based at least in part on completion of an LBT counter for one of the transport blocks of the pair of transport blocks and non-completion of an LBT counter for the other one of the pair of transport blocks.

21. The UE of claim 1, wherein the one or more processors are configured to select, after sensing that a subset of the transmit resources are clear for a specified minimum time before transmitting the at least two transport blocks, a resource of the subset for transmitting another transport block with an LBT counter that is completed and that does not have a reserved transmit resource.

22. The UE of claim 1, wherein the one or more processors are configured to select, after sensing that a subset of the transmit resources not reserved for the at least two transport blocks are clear for a specified minimum time before transmitting the at least two transport blocks, a resource of the subset for transmitting one of the at least two transport blocks that has an LBT counter that is completed, wherein the resource of the subset is in an earlier slot than an original reserved timing resource for the one of the at least two transport blocks.

23. The UE of claim 1, wherein the one or more processors are configured to select, after sensing that a subset of the transmit resources not reserved for the at least two transport blocks are clear for a specified minimum time before transmitting the at least two transport blocks, a resource of the subset for transmitting a transport block that has an LBT counter that is not completed.

24. A method of wireless communication performed by a user equipment (UE), comprising:
   obtaining, at a medium access control (MAC) layer of the UE, a set of listen-before-talk (LBT) completion instants for at least two transport blocks, the set of LBT completion instants indicative of when at least one LBT backoff countdown is to be completed;
   determining candidate resources on one or more physical sidelink shared channels (PSSCHs) that are clear for transmitting the at least two transport blocks, based at least in part on sensing a plurality of subchannels with respect to the set of LBT completion instants;
   selecting, from among the candidate resources, transmit resources on the one or more PSSCHs for transmitting the at least two transport blocks such that the at least two transport blocks are transmitted in one of: different subchannels of a same slot, or contiguous slots of a same subchannel; and
   transmitting the at least two transport blocks in the transmit resources.

25. The method of claim 24, wherein determining the candidate resources includes a physical (PHY) layer of the UE determining the candidate resources based at least in part on a request from the MAC layer, wherein the PHY layer indicates the candidate resources to the MAC layer, and wherein selecting the transmit resources includes the MAC layer selecting the transmit resources.

26. The method of claim 24, wherein selecting the transmit resources for transmitting the at least two transport blocks includes randomly selecting the transmit resources such that the at least two transport blocks are transmitted in different subchannels of a same slot.

27. The method of claim 24, wherein selecting the transmit resources for transmitting the at least two transport blocks includes selecting the transmit resources from among contiguous candidate resources that are adjacent to a previously reserved transmit resource or a transmit resource used for a previous transport block.

28. The method of claim 24, wherein selecting the transmit resources for transmitting the at least two transport blocks includes selecting a transmit resource from among contiguous candidate resources that are not adjacent to a previously reserved transmit resource or a transmit resource used for a previous transport block.

29. The method of claim 24, further comprising sensing, for a second time, at least one resource of the transmit resources at a specified minimum time before transmitting a transport block in the at least one resource, wherein transmitting the at least two transport blocks includes transmitting the transport block in the at least one resource based at least in part on a determination that the at least one resource is still clear after sensing the at least one resource for the second time.

30. The method of claim 24, further comprising selecting, after sensing that a subset of the transmit resources not reserved for the at least two transport blocks are clear for a specified minimum time before transmitting the at least two transport blocks, a resource of the subset for transmitting one of the at least two transport blocks that has an LBT counter that is completed, wherein the resource of the subset is in an earlier slot than an original reserved timing resource for the one of the at least two transport blocks.

\* \* \* \* \*